United States Patent
Koenig et al.

(10) Patent No.: US 8,762,909 B1
(45) Date of Patent: Jun. 24, 2014

(54) SYSTEM AND METHOD FOR AUTOMATIC TIMING-BASED REGISTER PLACEMENT AND REGISTER LOCATION ADJUSTMENT IN AN INTEGRATED CIRCUIT (IC)

(71) Applicant: Avago Technologies General IP (Singapore) Pte. Ltd., Singapore (SG)

(72) Inventors: Brady A. Koenig, Fort Collins, CO (US); Stephen L. Dixon, Fort Collins, CO (US); Jason Todd Gentry, Windsor, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/796,078

(22) Filed: Mar. 12, 2013

(51) Int. Cl.
    *G06F 17/50* (2006.01)

(52) U.S. Cl.
    USPC .......................................................... 716/108

(58) Field of Classification Search
    USPC ................................. 716/100, 108
    See application file for complete search history.

(56) References Cited

U.S. PATENT DOCUMENTS

| | | | |
|---|---|---|---|
| 6,505,333 B1 | 1/2003 | Tanaka | |
| 6,845,494 B2 | 1/2005 | Burks et al. | |
| 6,925,625 B2 | 8/2005 | Kim | |
| 8,185,860 B2 | 5/2012 | Burnstein et al. | |
| 8,307,316 B2* | 11/2012 | Albrecht et al. | 716/113 |
| 8,589,845 B2* | 11/2013 | Albrecht et al. | 716/113 |
| 2004/0068331 A1* | 4/2004 | Cronquist | 700/18 |
| 2004/0088664 A1* | 5/2004 | Srinivasan | 716/6 |
| 2008/0276208 A1* | 11/2008 | Albrecht et al. | 716/6 |
| 2011/0145776 A1* | 6/2011 | Rohe et al. | 716/129 |
| 2011/0252389 A1* | 10/2011 | Albrecht et al. | 716/108 |
| 2012/0036488 A1 | 2/2012 | Arunachalam et al. | |
| 2012/0182046 A1* | 7/2012 | Teig et al. | 326/41 |

* cited by examiner

Primary Examiner — Suchin Parihar

(57) ABSTRACT

An embodiment of a method for register placement in an integrated circuit (IC) includes determining a data path between circuit elements, placing at least one register along the data path, performing a static timing analysis on the data path, extracting top-level timing data to develop an extended timing path, the extended timing path comprising a plurality of timing path segments; processing the top-level timing data to determine whether the extended timing path violates a timing requirement, and moving the at least one register along the data path to satisfy the timing requirement if the timing requirement is violated.

15 Claims, 10 Drawing Sheets

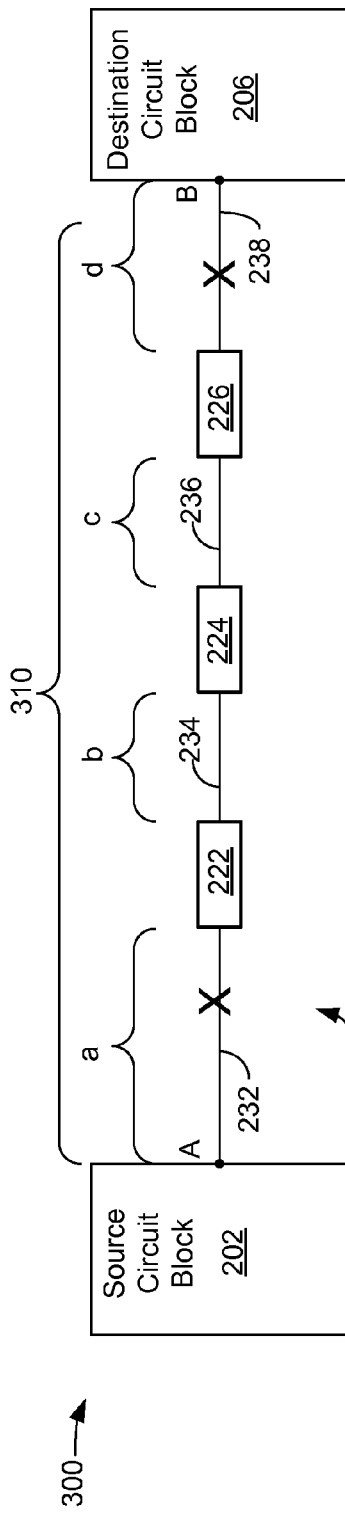
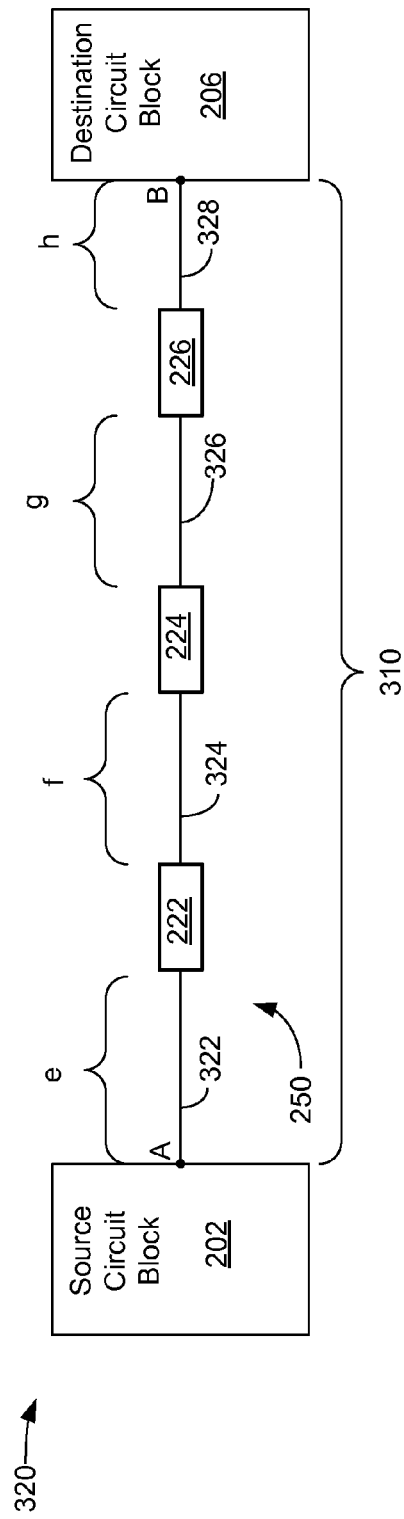

SYSTEM AND METHOD FOR AUTOMATIC TIMING-BASED REGISTER PLACEMENT AND REGISTER LOCATION ADJUSTMENT IN AN INTEGRATED CIRCUIT (IC)

BACKGROUND

A modern application specific integrated circuit (ASIC) must meet very stringent design and performance specifications. An ASIC, or any integrated circuit, generally comprises the placement and connection of various circuit elements and structures. The complexity of a modern ASIC dictates that the circuit design be performed at different hierarchical levels because the complexity prevents a single database from containing all aspects of the design. As an example, an ASIC design can be divided into different levels, with the connections between and among levels occurring by analyzing and processing different databases having the different connections. The process of laying out circuit elements is often referred to as "floor planning" because it comprises the operation of minimizing the space used for the circuit elements. To expedite the circuit design process, abstract models of circuit elements, also referred to as "sub chips" or "circuit blocks" or "block instances" are created to allow higher level circuit routing to occur on the circuit blocks without necessarily completing the design of each block. Each "sub chip" or "circuit block" may include logic, memory, or other circuit elements.

The process of standard IC floor planning involves manually placing block instances of circuit elements based on the desired connectivity of those elements, and the placement of registers based on the desired connectivity, route factors, and timing budgets. Initial register placement can be determined automatically based on circuit block placement, or can more accurately be determined by manual process based on circuit block placement, route type and timing budgets. Both the automatic and manual processes have advantages and drawbacks. For example, automatic register placement is quicker, but less accurate than manual placement. Manual register placement is slower and more error prone, but is ultimately more accurate. In both instances, when timing data is available, the register placement is manually adjusted to verify that all timing constraints are met. This manual adjustment to register location is time consuming, error prone, and is an inefficient use of engineering resources.

Therefore, it would be desirable to have a way of automatically placing registers in an IC, and automatically adjusting the register placement and location based on actual timing analysis.

SUMMARY

An embodiment of a method for register placement in an integrated circuit (IC) includes determining a data path between circuit elements, placing at least one register along the data path, performing a static timing analysis on the data path, extracting top-level timing data to develop an extended timing path, the extended timing path comprising a plurality of timing path segments, processing the top-level timing data to determine whether the extended timing path violates a timing requirement, and moving the at least one register along the data path to satisfy the timing requirement if the timing requirement is violated.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 3A and 3B are schematic diagrams illustrating an example of the operation of an embodiment of the system and method for automatic timing-based register placement and register location adjustment in an integrated circuit.

DETAILED DESCRIPTION

A system and method for automatic timing-based register placement and register location adjustment in an integrated circuit (IC) can be used in any application specific integrated circuit (ASIC) in which it is desirable to minimize the amount of space used by circuitry and efficiently create routing between and among circuit blocks.

The system and method for automatic timing-based register placement and register location adjustment in an integrated circuit will be described below as being implemented in an ASIC chip. However, the system and method for automatic timing-based register placement and register location adjustment in an integrated circuit can be implemented in any integrated circuit.

Figure 1:
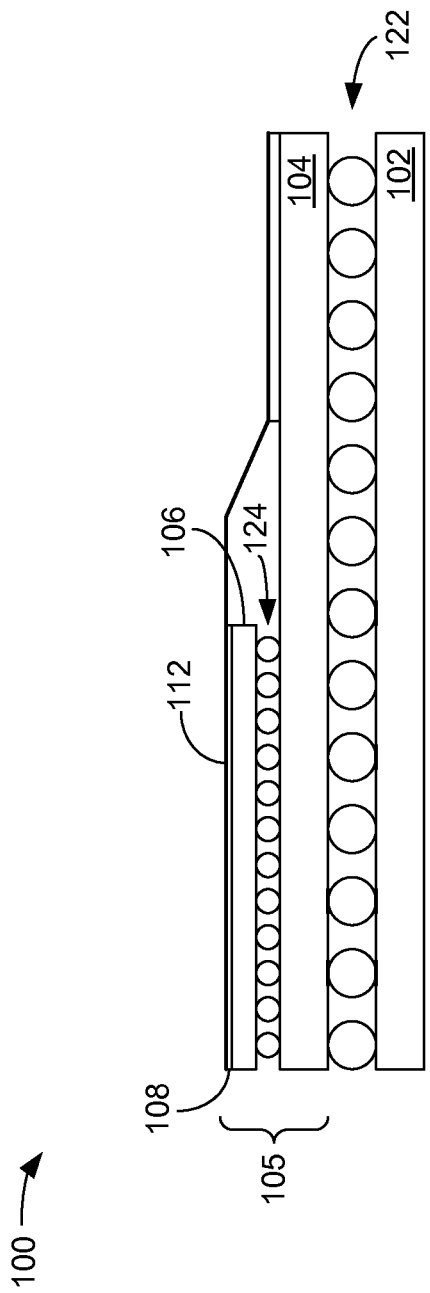
FIG. 1 is a schematic diagram illustrating a portion of an application specific integrated circuit (ASIC) assembly including transmission lines.

FIG. 1 is a schematic diagram illustrating a portion of an application specific integrated circuit (ASIC) assembly 100 in which the system and method for automatic timing-based register placement and register location adjustment in an integrated circuit can be implemented.

The assembly 100 comprises a printed circuit (PC) board 102 over which a circuit package 105 is located and attached to the PC board 102 using solder balls 122. An example of a circuit package 105 can be a DRAM package or another circuit package. Further, the circuit package 105 can be a flip-chip package, or another circuit package, as known to those skilled in the art. The PC board 102 can be any single-layer or multi-layer structure used to mount a circuit package, such as the circuit package 105 as known in the art. The solder balls 122 are an example of an attachment structure that can be used to electrically and mechanically attach the circuit package 105 to the PC board 102, and are known to those skilled in the art.

The circuit package 105 comprises a circuit element, also referred to as a "chip" 106 located and attached to a laminate structure 104 using solder bumps 124. The chip 106 generally comprises the active circuit elements of the ASIC circuitry, the routing of which will be described below. The solder bumps 124 are an example of an attachment structure that can be used to electrically and mechanically attach the chip 106 to the laminate structure 104, and are known to those skilled in the art. A lid 112 is attached to the circuit package 105 using an adhesive 108 as known to those skilled in the art.

The laminate structure 104 generally comprises a laminate core and one or more layers formed on one or both sides of the laminate core. The laminate structure 104 generally comprises a power distribution network and signal distribution connections, sometimes referred to as circuit traces, which transfer power and signal connections between the PC board 102 and the chip 106. Generally, the form factor and the array of solder bumps 124 of the chip 106 dictate that the connection to the PC board 102 and the array of solder balls 122 occur through an adaptive connection. The laminate structure 104 serves this adaptive connection function of coupling the chip 106 to the PC board 102, and distributing the connections between the chip 106 and the PC board 102. The laminate structure 104 generally comprises one or more power layers, ground plane (reference plane) layers, and wiring interconnects. The laminate structure 104 may also include one or more passages, referred to as "vias" that provide electrical connectivity between and among the various layers of the laminate structure 104.

Figure 2:
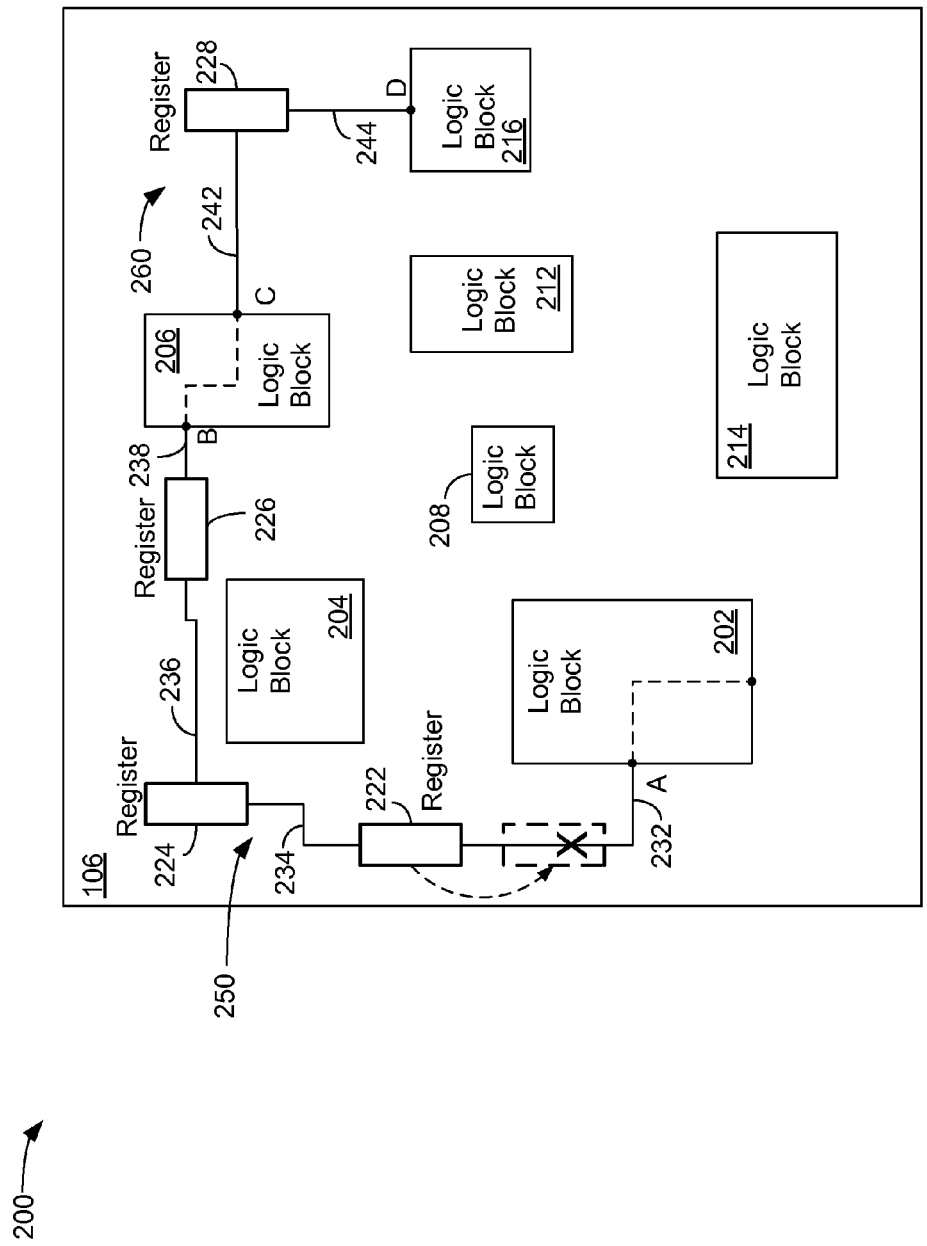
FIG. 2 is a plan-view block diagram illustrating a portion of the chip of FIG. 1.

FIG. 2 is a plan-view block diagram illustrating a portion 200 of the chip 106 of FIG. 1. The portion 200 of the chip 106 is a high-level simplified view to illustrate the concepts of the system and method for automatic timing-based register placement and register location adjustment in an integrated circuit, and many details of the chip 106 are not shown for simplicity.

The chip 106 comprises a number of circuit blocks 202, 204, 206, 208, 212, 214 and 216. Each circuit block 202, 204, 206, 208, 212, 214 and 216 can be an abstraction, or a portion or a sub chip of portions of the overall circuitry that resides on the chip 106. The circuit blocks 202, 204, 206, 208, 212, 214 and 216 are abstracted such that the floor planning, data routing and timing between and among the circuit blocks 202, 204, 206, 208, 212, 214 and 216 can be performed without being complicated by the details of the circuitry within each circuit block 202, 204, 206, 208, 212, 214 and 216. Moreover, although only seven circuit blocks are shown in FIG. 2, a typical chip would include many tens or hundreds of circuit blocks.

An embodiment of the system and method for automatic timing-based register placement and register location adjustment in an integrated circuit can be used to electrically connect the circuit blocks 202, 204, 206, 208, 212, 214 and 216 based on signal transfer, timing, propagation delay and other parameters and attributes. For illustrative purposes only, assume that it is desired to connect a pin "A" on the circuit block 202 with a pin "B" on the circuit block 206. The location of the circuit blocks 202, 204, 206, 208, 212, 214 and 216 on the chip 106 dictate that a particular route for that signal to travel from point "A" to point "B" may result in more than one clock cycle being needed for the signal to travel from point "A" to point "B". In such an example, a route having data lines 232, 234, 236 and 238 and registers 222, 224 and 226, may be practical as a suggested data path 250 (also referred to as a timing path) for the signal to travel from point "A" to point "B" given the propagation delay of the conductors that results in an anticipated four clock cycles for the signal to travel from point "A" to point "B" in this simplified example. The data path 250 assumes that each register has a delay of one clock cycle. In such an example, it would be desirable that each of the data lines 232, 234, 236 and 238 are fabricated, chosen, or otherwise selected such that the signal can traverse each of them within the period of one clock cycle. However, this may not be the case, as will be described below. Similarly, a route having data lines 242 and 244, and register 228, may be practical as a suggested data path 260 (also referred to as a timing path) for the signal to travel from point "C" on the circuit block 206 to point "D" on the circuit block 216. It is assumed that the register 228 has a delay of one clock cycle, and that each of the data lines 242 and 244 are fabricated such that the signal can traverse each of them within the period of one clock cycle.

The data paths 250 and 260 may be initially designed and then analyzed to determine whether each data line 232, 234, 236 and 238, for the data path 250, and whether each data line 242 and 244 for data path 260, complies with timing requirements.

For example using the data path 250, after initial placement of the registers 222, 224 and 226, a static timing analysis can be performed on the data path 250 to verify that each data line 232, 234, 236 and 238 allows the signal to traverse without producing any timing violations. If, for example, the data line 232 is too long and fails the static timing analysis, but the data line 234 is sufficiently short to pass the timing analysis with margin, then the register 222 can be moved along the route forming the data path 250 (in this example, toward the circuit block 202, to allow the data lines 232 and 234 to have a length that allows them each to pass the timing analysis, and thus, allow the data path 250 to comply with timing requirements.

FIGS. 3A and 3B are schematic diagrams illustrating an example of the operation of an embodiment of the system and method for automatic timing-based register placement and register location adjustment in an integrated circuit.

In FIG. 3A the circuit block 202 is arbitrarily referred to as a "source" block for a data signal and the circuit block 206 is arbitrarily referred to as a "destination" block for the data signal because in this example, a signal travels from point "A" to point "B". In this example, top-level timing data is developed for the data lines 232, 234, 236 and 238, and the registers 222, 224 and 226, such that an extended timing path 310 is developed. In this example, the term "top-level timing data" refers to the amount of time a signal takes to travel from point "A" to point "B" without having the details of the circuitry within the data blocks 202 and 206. Part of the top-level timing data also comprises the individual time that the data signal takes to travel across each data line 232, 234, 236 and 238.

Once the extended timing path 310 is developed, the extended timing path 310 is analyzed. In the example shown in FIG. 3A, assume that the data line 232 and the data line 238 each fail the static timing analysis and violate timing requirements.

FIG. 3B illustrates the operation of an embodiment of the system and method for automatic timing-based register placement and register location adjustment in an integrated circuit in which the register 222 is moved toward the circuit block 202 along the existing route of the data path 250 such that the data line 322 is shorter than the data line 232. In this example, the data line 232 has a length "a" and the data line 322 has a length "e" where a>e. Using this example, moving the register 222 toward the circuit block 202 shortens the data line 232, such that the data line 322 can pass the timing requirements; and lengthens the data line 234, but not so long that the data line 324 would fail the timing requirements. In this example, the length of the data line 234 is "b" and the length of the data line 324 is "f" and f>b. Therefore, the register 222 is moved along the route of the existing data path 250 and both the data line 322 and the data line 324 have lengths such that they will each pass timing requirements. In this manner, timing is satisfied without adding any additional registers.

Further, in this example, the register 226 is moved toward the circuit block 206 along the route of the existing data path 250 such that the data line 328 is shorter than the data line 238. In this example, the data line 238 has a length "d" and the data line 328 has a length "h" where d>h. Using this example, moving the register 226 toward the circuit block 206 shortens the data line 238, such that the data line 328 can pass the timing requirements, and lengthens the data line 236, but not so long that the data line 326 would fail the timing requirements. In this example, the length of the data line 236 is "c" and the length of the data line 326 is "g" and g>c. Therefore, the register 226 is moved along the route of the data path 250 and both the data line 326 and the data line 328 have lengths such that they will each pass timing requirements. Furthermore, the resultant movement of the registers 222 and 226 allows the entire data path 250 to pass timing requirements.

Figure 4:
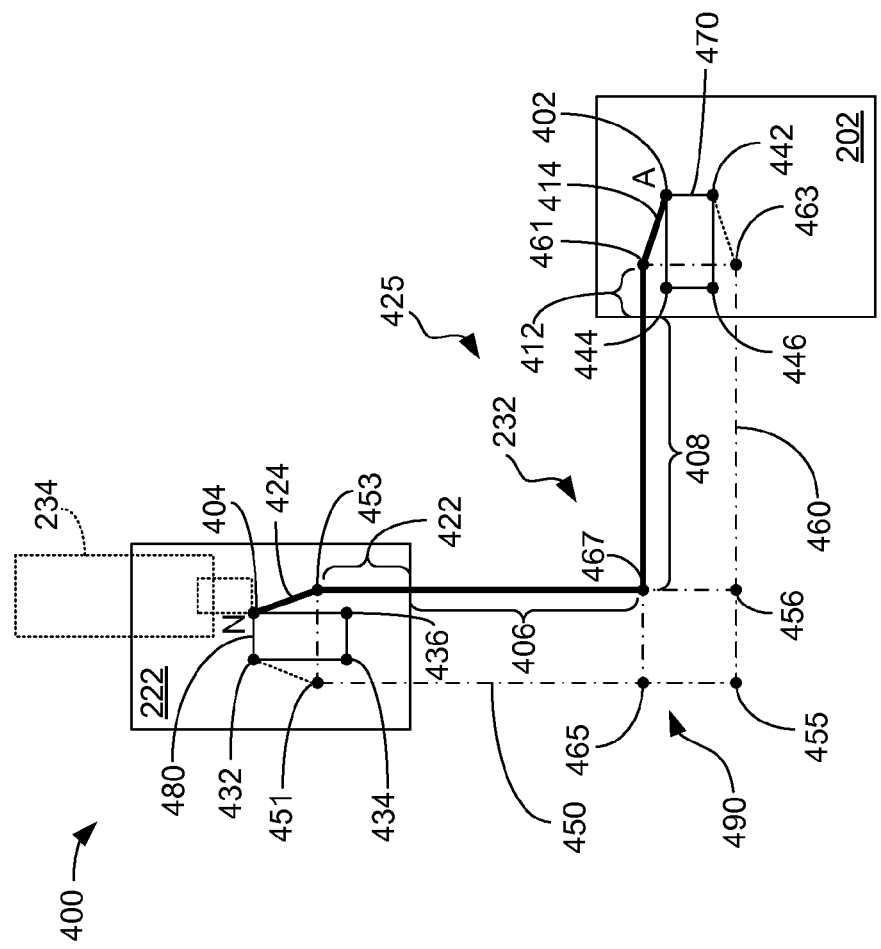
FIG. 4 is a schematic diagram illustrating an example of developing a route path for a data line.

FIG. 4 is a schematic diagram illustrating an example of developing a path of a route for a data line. FIG. 4 shows a single data line and the terminations thereof. In an example, the circuit block 202 comprises a driving pin "A", 402 and a register 222 comprises a receiving pin "N", 404.)

In the example shown in FIG. 4, the data line 232 that connects the circuit block 202 and the register 222 is illustrated as having an "L" shape but it can have any shape. The data line 232 comprises a data line segment 406 and a data line segment 408. The portion of the data line 232 that occurs on the circuit block 202 is illustrated as having a segment 412 and a segment 414. The portion of the data line 232 that occurs on the register 222 is illustrated as having a segment 422 and a segment 424. In the example of FIG. 4, the segments 406, 408, 412, 414, 422 and 424 form a timing path segment 425, which depending on the route of the data path 250, a number of such timing path segments may form the extended timing path 310 (FIG. 3A).

A bounding box 450 is formed by connecting the points 451, 453, 455 and 456, and a bounding box 460 is formed by connecting the points 461, 463, 465 and 455. A bounding box 470 is formed by connecting the points 402, 442, 444 and 446; and a bounding box 480 is formed by connecting the points 404, 432, 434 and 436.

To develop the timing path segment 425, the bounding boxes 450, 460, 470 and 480 are logically OR'd together, which returns all boxes as polygons, resulting in a polygon 490 bounded by points 402, 461, 467, 453, 404, 432, 451, 455, 463 and 442. The location of the driving pin 402 is known and the location of the receiving pin 404 is known. To define the timing path segment 425, the shortest distance between the pins 402 and 404 is determined, which in this example, comprises the segments 414, 412, 408, 406, 422 and 424.

Figure 5:
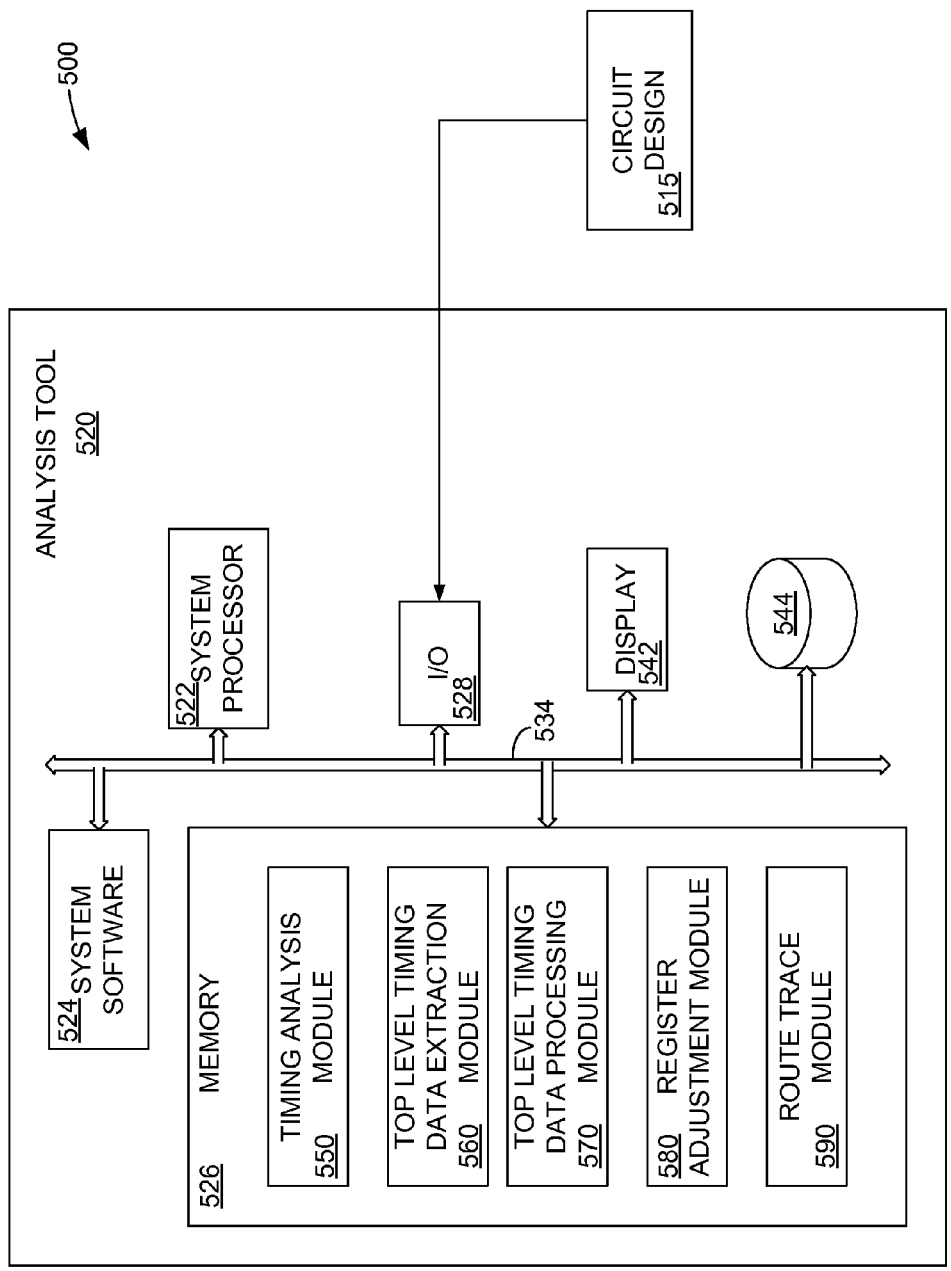
FIG. 5 is a block diagram illustrating an embodiment of a system that can be used to implement a method for automatic timing-based register placement and register location adjustment in an integrated circuit.

FIG. 5 is a block diagram illustrating an embodiment of a system 500 that can be used to implement a method for automatic timing-based register placement and register location adjustment in an integrated circuit.

In an embodiment, the system 500 can comprise a circuit analysis tool 520 that can be configured to perform a variety of circuit analysis processes on a circuit design 515. In an embodiment, the circuit analysis tool 520 can be a computing system that can be configured to analyze the register placement and perform the register location adjustment in, as described herein.

The analysis tool 520 comprises a system processor 522, system software 524, a memory 526, an input/output (I/O) element 528, and a display 542 coupled together over a system bus 534. The system bus 534 can be any combination of logical and physical connections that allows bi-directional communication and interoperability between and among the connected elements. A database 544 can also be coupled to the system bus 534. In an embodiment, the database 544 may contain the static timing information of the circuit design 515.

The system processor 522 can be any general-purpose or special-purpose processor or microprocessor that is used to control the operation of the analysis tool 520. The system software 524 can contain executable instructions in the form of application software, execution software, embedded software, or any other software or firmware that controls the operation of the analysis tool 520. The memory 526 may include a timing analysis module 550, a top-level data extraction module 560, a top-level data timing processing module 570, a register adjustment module 580 and a route trace module 590.

Figure 6:
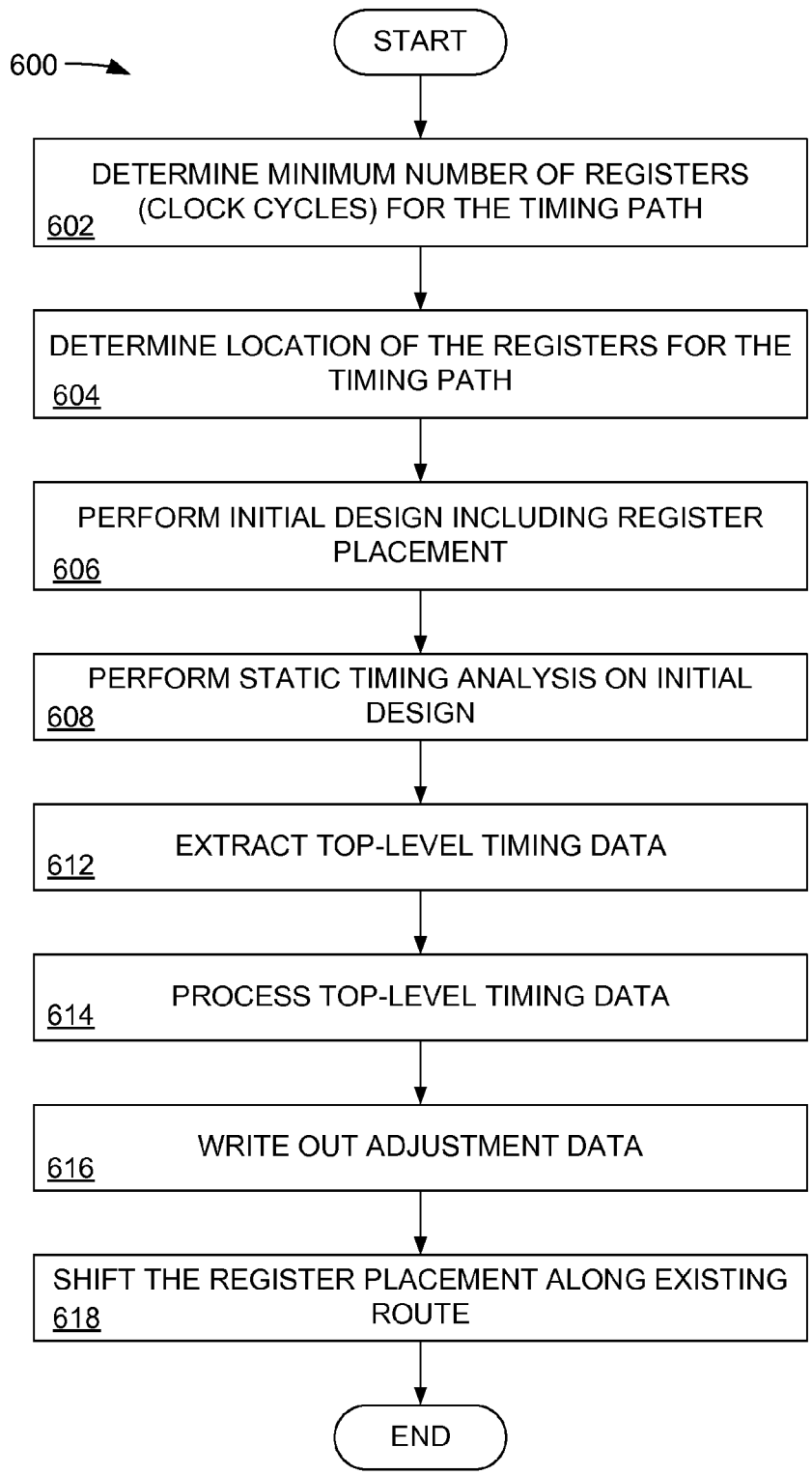
FIG. 6 is a flow chart describing the operation of an embodiment of a method for automatic timing-based register placement and register location adjustment in an integrated circuit.

FIG. 6 is a flow chart 600 describing the operation of an embodiment of a method for automatic timing-based register placement and register location adjustment in an integrated circuit.

In block 602, a minimum number of registers for a given data path is estimated. The estimation is based on a number of factors including, but not limited to, the system clock speed of the integrated circuit, the locations and distance between the circuit blocks sought to be connected, the electrical characteristics of the conductors used to connect the circuit blocks, and other factors and parameters.

In block 604, the location of the number of registers determined in block 602 for the given data path is determined. The locations of the registers is determined based on a number of factors including, but not limited to, the system clock speed of the integrated circuit, the locations and distance between the circuit blocks sought to be connected, the electrical characteristics of the conductors used to connect the circuit blocks, and other factors and parameters.

In block 606, an initial design is performed including initial register placement in locations determined in block 604.

In block 608, a static timing analysis is performed on the design of block 606. In an embodiment, the timing analysis module (550, FIG. 5) determines the static timing by determining whether there is any timing slack, whether positive (+) or negative (−) on the initial design.

In block 612, top level timing data is extracted. For example, the top level timing data extraction module (560, FIG. 5) develops an extended timing path for each data path and each route.

In bock 614, the top level timing data is processed. For example, the top level timing data processing module (570, FIG. 5) obtains a route type for each extended timing path and computes a register location adjustment that optimizes timing slack.

In block 616, the results of the operation of the top level timing data processing module (570, FIG. 5) are read out in the form of adjustment data that lists any registers that are to be moved and the distance to move them.

In block 618, the registers are moved along the existing route. For example, the register adjustment module 580 and the route trace module 590 determine the direction and distance to move any registers that are to be moved.

Figure 7:
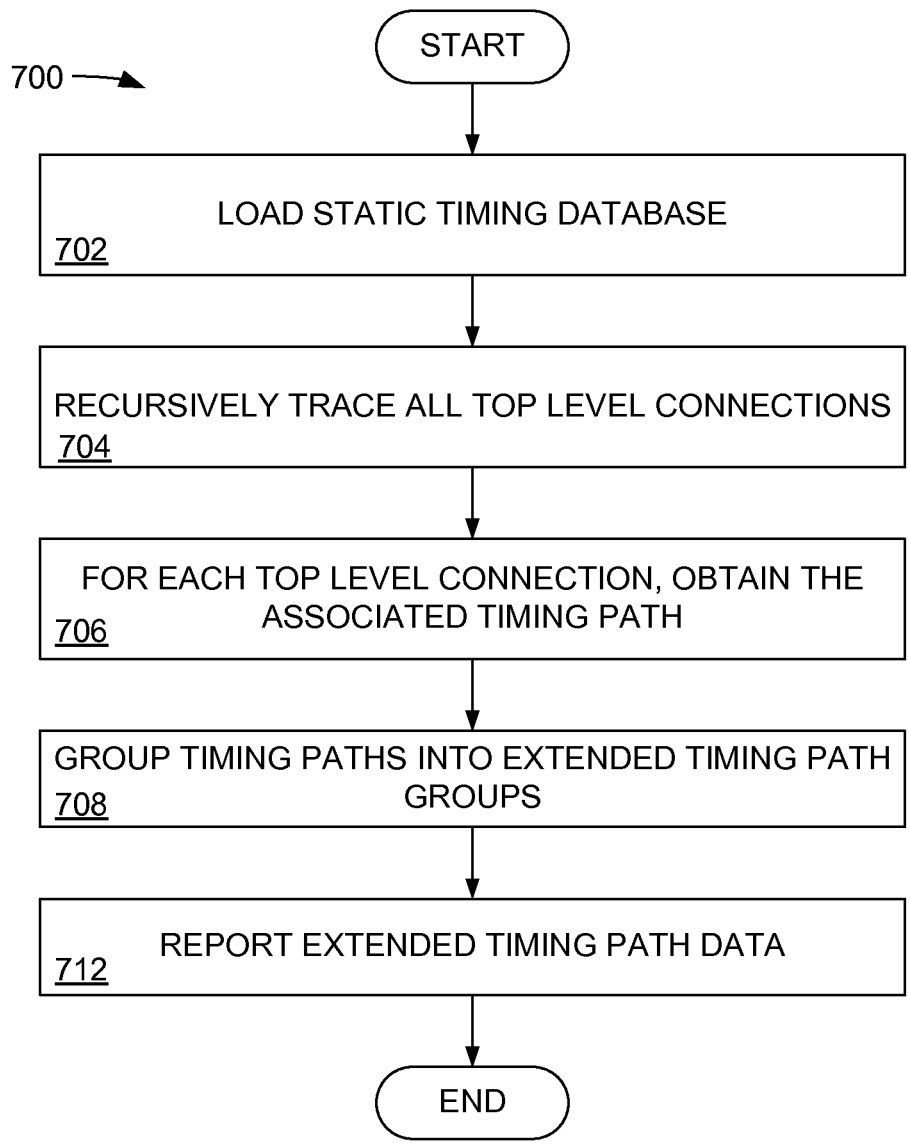
FIG. 7 is a flow chart describing the operation of the top level timing data extraction module of FIG. 5.

FIG. 7 is a flow chart 700 describing the operation of the top level timing data extraction module 560 of FIG. 5 and the step 612 of FIG. 6.

In block 702, a static timing database is loaded. As an example, the static timing database can be stored in the database 544 (FIG. 5) for use by the top level timing data extraction module 560 (FIG. 5).

In block 704, all top level connections in the static timing database 542 are recursively traced.

In block 706, for each top level connection, the associated timing path is obtained.

In block 708, the top level timing paths for each top level connection are grouped into extended timing paths In block 712, the extended timing path data is reported. For example, the data relating to the extended timing path 250 (FIGS. 3A and 3B) are saved and made available to the top level timing data processing module 570 (FIG. 5).

Figure 8:
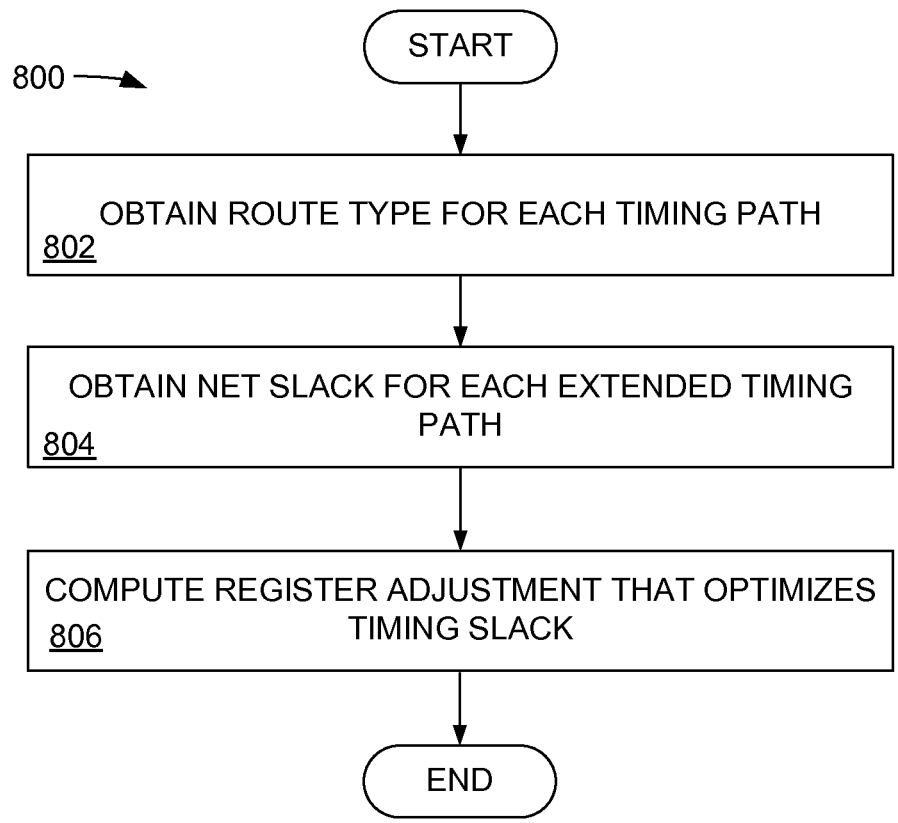
FIG. 8 is a flow chart describing the operation of the top level timing data processing module of FIG. 5.

FIG. 8 is a flow chart 800 describing the operation of the top level timing data processing module 570 of FIG. 5 and the step 614 of FIG. 6.

In block 802, a route type for each extended timing path is obtained. A route type defines the wire width, wire to wire spacing, and wire thickness. These can vary depending on performance requirements and system design requirements.

In block 804, the net timing slack for each extended timing path is obtained. The term "net timing slack" refers to any timing availability in any of the data lines that comprise a data path. For example, referring to the data path 250 in FIGS. 3A and 3B, net timing slack would refer to the timing analysis of the data lines 232, 234, 236 and 238 with respect to the amount of time a signal would travel from point "A" to point "B", with the timing slack determined for each data line. Using the example of FIGS. 3A and 3B, the data lines 232 and 238 would have "negative (−)" slack because they pose timing violations, and the data lines 234 and 236 would have "positive (+)" slack because they do not pose timing violations. The total net slack is the combination of the total slack for each data line.

In block 806, top level timing data processing module 570 determines the register adjustment that optimizes the use of any available positive (+) timing slack.

Figure 9:
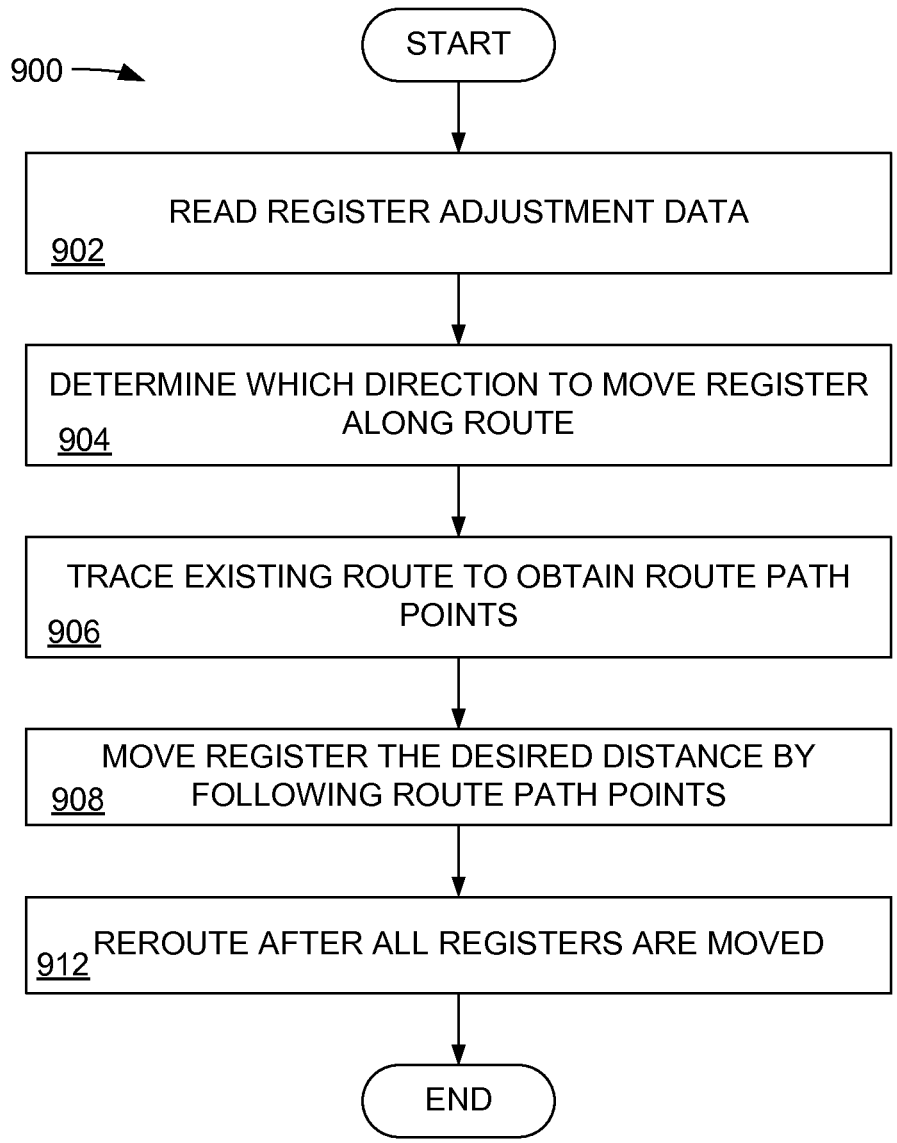
FIG. 9 is a flow chart describing the operation of the register adjustment module of FIG. 5.

FIG. 9 is a flow chart 900 describing the operation of the register adjustment module 580 of FIG. 5 and the step 618 of FIG. 6.

In block 902, the register adjustment data from the top level timing data processing module 570 (FIG. 5) is read.

In block 904, the register adjustment module 580 (FIG. 5) determines which direction along a route to move a register. For example, if a data line corresponds to negative timing slack (−), then the register may be moved closer to the source circuit block. For example, the register 222 in FIG. 3B can be moved along the route (the data path 250) toward the circuit block 202 so that the data line 322 can comply with timing requirements.

In block 906, the existing route is traced to obtain the route path points. Referring to FIG. 4, the timing path segment 425 is determined and a route that includes segments 414, 412, 408, 406, 422 and 424 is determined.

In block 908, the register adjustment module 580 (FIG. 5) moves the register the desired distance along the data path 250 by following the route path points described above and in FIG. 4.

In block 912, after all registers are moved, the timing paths are rerouted and the process can be repeated.

Figure 10:
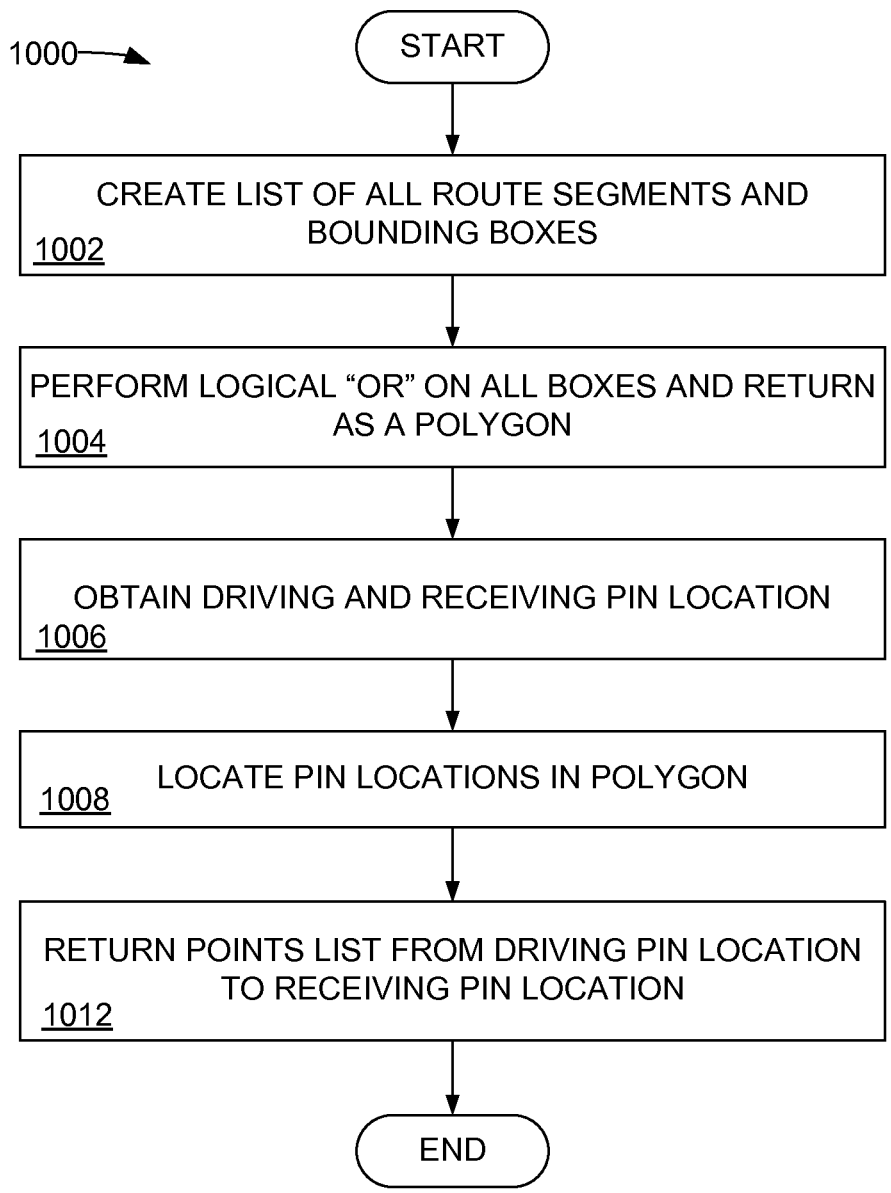
FIG. 10 is a flow chart describing the operation of the route path determination of FIG. 9.

FIG. 10 is a flow chart 1000 describing the operation of block 906 of FIG. 9.

In block 1002, a list of all route segments and bounding boxes is created. Referring to FIG. 4, the bounding boxes 450, 460, 470 and 480 are created.

In block 1004, the bounding boxes 450, 460, 470 and 480 are logically OR'd, which returns all boxes as polygons. Referring to FIG. 4, the resultant polygon 490 is created.

In block 1006, the location of the driving pin 402 and the location of the receiving pin 404 are obtained.

In block 1008. The location of the driving pin 402 and the location of the receiving pin 404 are located in the polygons and particularly, in the polygon 490.

In block 1012, the point list that connects the driving pin 402 and the receiving pin 404 is obtained. In the example above in FIG. 4, this point list includes points 402, 461, 467, 453 and 404, which comprises the segments 414, 412, 408, 406, 422 and 424.

This disclosure describes the invention in detail using illustrative embodiments. However, it is to be understood that the invention defined by the appended claims is not limited to the precise embodiments described.

What is claimed is:

1. A computer-implemented method for register placement in an integrated circuit (IC), comprising:
   determining with a processor a data path between circuit elements;
   placing at least one register along the data path;
   performing with the processor a static timing analysis on the data path;
   extracting with the processor top-level timing data to develop an extended timing path, the extended timing path comprising a plurality of timing path segments;
   processing the top-level timing data with the processor to determine whether the extended timing path violates a timing requirement; and
   moving the at least one register along the data path to satisfy the timing requirement if the timing requirement is violated;
   wherein a timing path segment comprises a driving pin and a receiving pin connected by line segments, the line segments selected by:
      connecting with the processor a plurality of points on a circuit into a plurality of bounding boxes, a first bounding box having the driving pin and a second bounding box having the receiving pin;
      logically combining with the processor the bounding boxes to form a polygon, the polygon having a plurality of segments defined by selected points from the plurality of bounding boxes; and
      the timing path segment chosen by selecting with the processor line segments that form a shortest route between the driving pin and the receiving pin.

2. The method of claim 1, wherein performing a static timing analysis on the data path comprises obtaining with the processor a timing factor for each timing path segment.

3. The method of claim 1, wherein extracting top-level timing data to develop an extended timing path comprises grouping with the processor the timing path segments into extended timing paths.

4. The method of claim 1, wherein processing the top-level timing data to determine whether the extended timing path violates a timing requirement comprises obtaining with the processor timing slack for each timing path segment.

5. The method of claim 1, wherein moving the at least one register along the data path to satisfy a timing requirement comprises moving the at least one register while satisfying a net timing factor for each timing path segment.

6. A system for register placement in an integrated circuit (IC), comprising:
   a data path between circuit elements;
   at least one register placed along the data path;

logic for performing a static timing analysis on the data path;

logic for extracting top-level timing data to develop an extended timing path, the extended timing path comprising a plurality of timing path segments;

logic for processing the top-level timing data to determine whether the extended timing path violates a timing requirement; and logic for moving the at least one register along the data path to satisfy the timing requirement if the timing requirement is violated;

wherein a timing path segment comprises a driving pin and a receiving pin connected by line segments, the line segments selected by:

connecting a plurality of points on a circuit design into a plurality of bounding boxes, a first bounding box having the driving pin and a second bounding box having the receiving pin;

logically combining the bounding boxes to form a polygon, the polygon having a plurality of segments defined by selected points from the plurality of bounding boxes; and the timing path segment chosen by selecting line segments that form a shortest route between the driving pin and the receiving pin.

7. The system of claim 6, wherein performing a static timing analysis on the data path comprises obtaining a timing factor for each timing path segment.

8. The system of claim 6, wherein extracting top-level timing data to develop an extended timing path comprises grouping the timing path segments into extended timing paths.

9. The system of claim 6, wherein processing the top-level timing data to determine whether the extended timing path violates a timing requirement comprises obtaining timing slack for each timing path segment.

10. The system of claim 6, wherein moving the at least one register along the data path to satisfy a timing requirement comprises moving the at least one register while satisfying a net timing factor for each timing path segment.

11. An integrated circuit (IC) assembly, comprising:

an integrated circuit chip having a plurality of circuit elements connected by data paths;

at least one register placed along the data path;

logic for performing a static timing analysis on the data path;

logic for extracting top-level timing data to develop an extended timing path, the extended timing path comprising a plurality of timing path segments;

logic for processing the top-level timing data to determine whether the extended timing path violates a timing requirement; and logic for moving the at least one register along the data path to satisfy the timing requirement if the timing requirement is violated;

wherein a timing path segment comprises a driving pin and a receiving pin connected by line segments, the line segments selected by:

connecting a plurality of points on a circuit design into a plurality of bounding boxes, a first bounding box having the driving pin and a second bounding box having the receiving pin;

logically combining the bounding boxes to form a polygon, the polygon having a plurality of segments defined by selected points from the plurality of bounding boxes;

the timing path segment chosen by selecting line segments that form a shortest route between the driving pin and the receiving pin.

12. The integrated circuit assembly of claim 11, wherein performing a static timing analysis on the data path comprises obtaining a timing factor for each timing path segment.

13. The integrated circuit assembly of claim 11, wherein extracting top-level timing data to develop an extended timing path comprises grouping the timing path segments into extended timing paths.

14. The integrated circuit assembly of claim 11, wherein processing the top-level timing data to determine whether the extended timing path violates a timing requirement comprises obtaining timing slack for each timing path segment.

15. The integrated circuit assembly of claim 11, wherein moving the at least one register along the route to satisfy a timing requirement comprises moving the at least one register while satisfying a net timing factor for each timing path segment.

\* \* \* \* \*